United States Patent
Zhang et al.

(10) Patent No.: US 11,910,235 B2
(45) Date of Patent: Feb. 20, 2024

(54) DATA PROCESSING METHOD, INFORMATION CONFIGURATION METHOD, TERMINAL, AND NETWORK DEVICE

(71) Applicant: VIVO MOBILE COMMUNICATION CO., LTD., Guangdong (CN)

(72) Inventors: Yanxia Zhang, Dongguan (CN); Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 347 days.

(21) Appl. No.: 17/378,541

(22) Filed: Jul. 16, 2021

(65) Prior Publication Data
US 2021/0345176 A1 Nov. 4, 2021

Related U.S. Application Data

(63) Continuation of application No. PCT/CN2020/072746, filed on Jan. 17, 2020.

(30) Foreign Application Priority Data

Jan. 18, 2019 (CN) .......................... 201910108439.9

(51) Int. Cl.
H04W 28/06 (2009.01)
(52) U.S. Cl.
CPC .................................. *H04W 28/06* (2013.01)
(58) Field of Classification Search
CPC ..... H04W 28/06; H04W 28/08; H04W 76/22; H04W 76/27
See application file for complete search history.

(56) References Cited

U.S. PATENT DOCUMENTS

2018/0309660 A1 10/2018 Loehr et al.
2018/0324642 A1* 11/2018 Yu .......................... H04L 5/0053
2018/0332501 A1* 11/2018 Tseng ........................ H04L 1/08
(Continued)

FOREIGN PATENT DOCUMENTS

CN 103596213 A 2/2014
CN 107241164 A 10/2017
(Continued)

OTHER PUBLICATIONS

Supplementary European Search Report regarding Patent Application No. 20741265.1-1215/3913968; PCT/CN2020/072746, dated Feb. 15, 2022.

(Continued)

*Primary Examiner* — Farid Seyedvosoghi
(74) *Attorney, Agent, or Firm* — Harness, Dickey & Pierce, P.L.C.

(57) ABSTRACT

A data processing method includes: determining, by a PDCP entity of a terminal, at least one first transmission path that is in a transmission path set currently in an activated state and that needs to be changed from the activated state to a deactivated state; and instructing, by the PDCP entity of the terminal, a RLC entity corresponding to the first transmission path to discard duplicated data, in a case where the at least one first transmission path is not all transmission paths in the transmission path set. The transmission path set comprises at least one transmission path.

20 Claims, 5 Drawing Sheets

(56) References Cited

U.S. PATENT DOCUMENTS

| | | | |
|---|---|---|---|
| 2019/0254117 A1* | 8/2019 | Chen | H04L 47/34 |
| 2020/0119864 A1 | 4/2020 | Xu et al. | |
| 2020/0187297 A1* | 6/2020 | Jiang | H04L 1/0006 |
| 2020/0374752 A1* | 11/2020 | Xiao | H04W 76/15 |
| 2021/0126746 A1* | 4/2021 | Li | H04W 76/15 |

FOREIGN PATENT DOCUMENTS

| | | |
|---|---|---|
| CN | 108401484 A | 8/2018 |
| CN | 109151891 A | 1/2019 |
| WO | WO-2018221926 A1 | 12/2018 |

OTHER PUBLICATIONS

"Multiple duplicate handling," Ericsson, 3GPP TSG-RAN WG2 #104, R2-1817180, dated Nov. 16, 2018.

"Resource efficient data duplication," Ericsson 3GPP TSG-RAN WG2 #104, R2-1817179, dated Nov. 16, 2018.

"Consideration on PDCP Duplication with Multiple Copies," ZTE, Sanechips, 3GPP TSG-RAN WG2 Meeting #104, R2-1817071, dated Nov. 16, 2018.

Huawei et al. "UE Behaviors upon Duplication Activation and Deactivation," 3GPP TSG-RAN WG2 #101, R2-1801943, Athens, Greece, Feb. 26, 2018 (Feb. 26, 2018).

Huawei et al. "RLC Behaviors upon Duplicate Deactivation," 3GPP TSG RAN WG2 #99, R2-1707718, Berlin, Germany, Aug. 21, 2017 (Aug. 21, 2017).

First Office Action of Chinese Priority Application No. 201910108439.9, dated Mar. 1, 2021. Translation provided by Bohui Intellectual Property.

International Search Report and Written Opinion of the International Searching Authority regarding International Patent Application No. PCT/CN2020/072746, dated Apr. 7, 2019. Translation provided by Bohui Intellectual Property.

* cited by examiner

US 11,910,235 B2

DATA PROCESSING METHOD, INFORMATION CONFIGURATION METHOD, TERMINAL, AND NETWORK DEVICE

CROSS-REFERENCE TO RELATED APPLICATIONS

This application is a Bypass Continuation Application of PCT/CN2020/072746 filed on Jan. 17, 2020, which claims priority to Chinese Patent Application No. 201910108439.9 filed on Jan. 18, 2019, which are incorporated herein by reference in their entirety.

TECHNICAL FIELD

The present disclosure relates to the field of communications technologies, and in particular, to a data processing method, an information configuration method, a terminal, and a network device.

BACKGROUND

When a transmission path corresponding to a radio bearer (RB) is deactivated, to improve resource utilization, a Packet Data Convergence Protocol (PDCP) instructs a Radio Link Control (RLC) entity corresponding to the deactivated transmission path to discard a duplicated data packet received from an upper layer.

However, when the RB is configured with a PDCP data duplication function for more than two transmission paths, if the discarded data has no copy in a currently active transmission path, packet removal is caused.

SUMMARY

Embodiments of the present disclosure provide a data processing method, an information configuration method, a terminal, and a network device.

According to a first aspect, an embodiment of the present disclosure provides a data processing method, applied to a terminal and including:

determining, by a PDCP entity of the terminal, at least one first transmission path that is in a transmission path set currently in an activated state and that needs to be changed from the activated state to a deactivated state; and instructing, by the PDCP entity of the terminal, a RLC entity corresponding to the first transmission path to discard duplicated data, in the case where the at least one first transmission path is not all transmission paths in the transmission path set; where the transmission path set includes at least one transmission path.

According to a second aspect, an embodiment of the present disclosure provides an information configuration method, applied to a network device and including:

sending configuration information of a PDCP data duplication function of a first RB to a terminal; where the PDCP data duplication function corresponds to at least three transmission paths.

According to a third aspect, an embodiment of the present disclosure provides a terminal, including:

a determining module, configured to determine at least one first transmission path that is in a transmission path set currently in an activated state and that needs to be changed from the activated state to a deactivated state; and an instruction module, configured to: instruct a RLC entity corresponding to the first transmission path to discard duplicated data, in the case where the at least one first transmission path is not all transmission paths in the transmission path set; where the transmission path set includes at least one transmission path.

According to a fourth aspect, an embodiment of the present disclosure provides a terminal, including a memory, a processor, and a program that is stored in the memory and executable on the processor, where the program is executed by the processor to implement steps of the foregoing data processing method.

According to a fifth aspect, an embodiment of the present disclosure provides a network device, including:

a sending module, configured to send configuration information of a PDCP data duplication function of a first RB to a terminal; where the PDCP data duplication function corresponds to at least three transmission paths.

According to a sixth aspect, an embodiment of the present disclosure provides a network device, including a memory, a processor, and a program that is stored in the memory and executable on the processor, where the program is executed by the processor to implement steps of the foregoing information configuration method.

According to a seventh aspect, an embodiment of the present disclosure provides a non-transitory computer-readable storage medium, where the non-transitory computer-readable storage medium stores a program, and the program is executed by a processor to implement steps of the foregoing data processing method or steps of the foregoing information configuration method.

DETAILED DESCRIPTION OF EMBODIMENTS

To make the objects, technical solutions, and advantages of the present disclosure clearer, the following describes the present disclosure in detail with reference to the accompanying drawings and specific embodiments.

In the descriptions of the embodiments of the present disclosure, some concepts used in the following descriptions are explained first.

1. Introduction to Packet Data Convergence Protocol (PDCP) Data Duplication (that is, PDCP Duplication) Sending In New Radio (NR), to improve data transmission reliability, a PDCP duplication function is introduced. After a network side configures whether a PDCP layer corresponding to a radio bearer (RB) of user equipment (UE, also referred to as a terminal) needs to duplicate data of a PDCP entity, the network side separately sends the duplicated data by using two different paths (for example, two different Radio Link Control (RLC) entities). Different RLC entities correspond to different logical channels.

The PDCP data duplication function may indicate, by using Medium Access Control signaling (i.e., Medium Access Control Control Element (MAC CE)), whether to enable (that is, to activate) or to disable (that is, to deactivate). When configuring the PDCP data duplication function for the RB, the network side may configure whether the function is enabled immediately after being configured, in other words, no MAC CE signaling is required to perform additional activation.

2. Bearer Type of the PDCP Data Duplication Function

Figure 1:
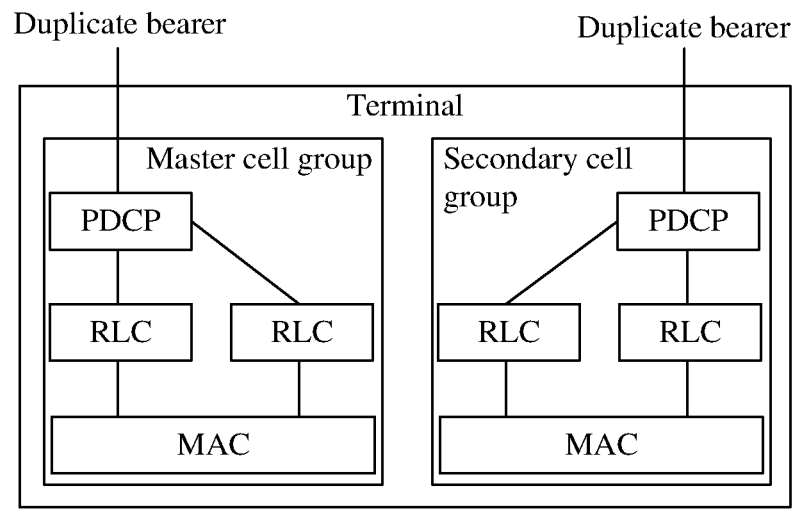
FIG. 1 is a schematic diagram of a bearer type of a PDCP data duplication function.
Figure 2:
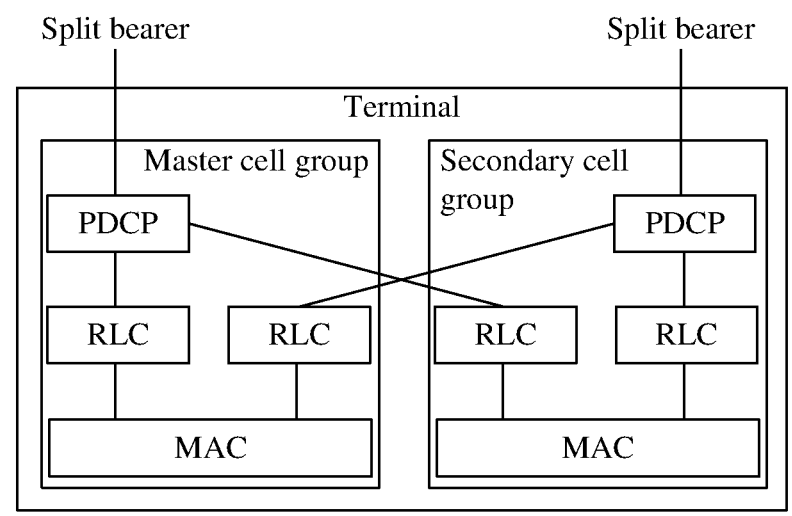
FIG. 2 is a schematic diagram of another bearer type of a PDCP data duplication function.

In a 5G system, because a dual connectivity (DC) architecture is used (including two cell groups: a master cell group (MCG) and a secondary cell group (SCG)), the bearer type of the PDCP data duplication function includes two types shown in FIG. 1 and FIG. 2.

A11. Split bearer: A PDCP entity corresponding to the bearer is in one cell group, and two (or more) corresponding RLC entities and two (or more) corresponding MAC entities are in different cell groups.

A12. Duplicate bearer: The bearer corresponds to one PDCP entity, two (or more) RLC entities, and one MAC entity in one cell group.

The MCG corresponds to a MCG MAC entity, and the SCG corresponds to an SCG MAC entity.

A network entity corresponding to the MCG is a main node (MN), and a network entity corresponding to the SCG is a secondary node (SN).

3. Multi-Path PDCP Data Duplication (Multiple Leg PDCP Duplication)

Figure 3:
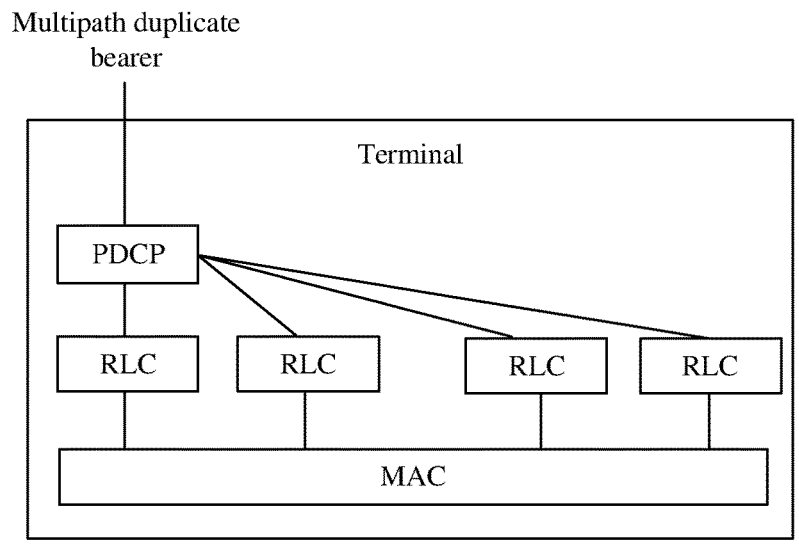
FIG. 3 is a schematic diagram of a bearer type of a multipath PDCP data duplication function.
Figure 4:
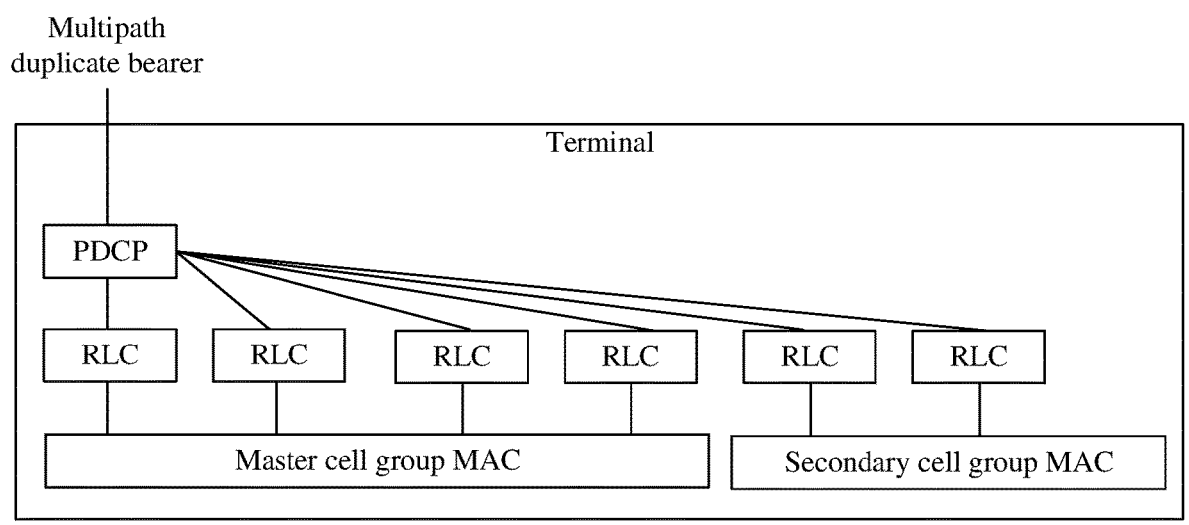
FIG. 4 is a schematic diagram of another bearer type of a multipath PDCP data duplication function.

As shown in FIG. 3 and FIG. 4, the PDCP data duplication function may be configured with more than two (for example, three) transmission paths (for example, one PDCP entity corresponds to more than three RLC entities), and the network side may choose to deactivate one or more of the paths (for example, one path may be deactivated, but there are still two paths that can work). The deactivated path is not used for data receiving or sending, and the PDCP data duplication function may still be used by using an activated path. For the deactivated path, the terminal cannot send data through the logical channel. For the activated path, the terminal can send data through the logical channel.

A technical problem to be resolved in the present disclosure is that, when a transmission path corresponding to an RB is deactivated, to improve resource utilization, a PDCP entity instructs an RLC entity corresponding to the deactivated transmission path to discard a duplicated data packet received from an upper layer. However, when the RB is configured with a PDCP data duplication function for more than two transmission paths, if the discarded data has no copy in a currently activated transmission path, packet removal is caused.

For the foregoing problem, the present disclosure provides a data processing method, an information configuration method, a terminal, and a network device.

Figure 5:
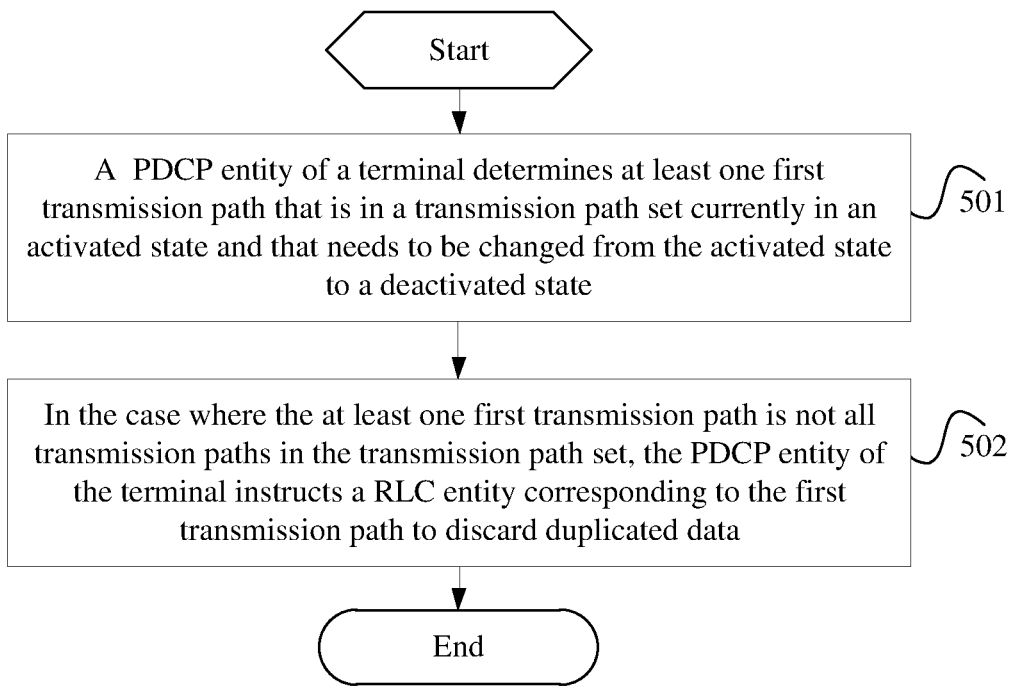
FIG. 5 is a schematic flowchart of a data processing method according to an embodiment of the present disclosure.

As shown in FIG. 5, an embodiment of the present disclosure provides a data processing method. The data processing method is applied to a terminal and includes the following steps:

Step 501: A PDCP entity of the terminal determines at least one first transmission path that is in a transmission path set currently in an activated state and that needs to be changed from the activated state to a deactivated state.

It should be noted that the transmission path set includes at least one transmission path.

Step 502: in the case where the at least one first transmission path is not all transmission paths in the transmission path set, the PDCP entity of the terminal instructs a RLC entity corresponding to the first transmission path to discard duplicated data.

For example, the duplicated data is a PDCP protocol data unit (PDU).

It should be noted that, in this embodiment of the present disclosure, in the case where a Packet Data Convergence Protocol (PDCP) data duplication function of a first radio bearer (RB) corresponds to at least three transmission paths, the first RB is a specific RB of the terminal.

It should be noted that, in this embodiment of the present disclosure, if not all transmission paths currently in the activated state are configured to be deactivated, the PDCP entity only instructs an RLC entity corresponding to a transmission path configured to be deactivated to discard duplicated data; and if all the transmission paths currently in the activated state are configured to be deactivated, the PDCP entity does not instruct the RLC entity corresponding to the transmission paths that are configured to be deactivated to discard duplicated data. It should be noted that the duplicated data is received by the RLC entity from an upper layer, so that a case in which packet removal is easily caused when all the activated paths are deactivated can be avoided.

It should be noted that, it is assumed that when instructing the RLC entity to discard the duplicated data, the PDCP entity of the terminal sends a discard instruction to the RLC entity, and the PDCP entity of the terminal does not instruct the RLC entity to discard the duplicated data, which means that the PDCP entity of the terminal does not send the discard instruction to the RLC entity.

For example, a PDCP data duplication function of a specific RB of the terminal corresponds to six transmission paths: a transmission path 1, a transmission path 2, a transmission path 3, a transmission path 4, a transmission path 5, and a transmission path 6. At a previous moment, the transmission path 1, the transmission path 2, the transmission path 3, and the transmission path 4 are all in an activated state. At a next moment, the terminal learns that a network device configures the transmission path 1, the transmission path 2, and the transmission path 3 to be deactivated. In this case, the PDCP entity instructs RLC entities corresponding to the transmission path 1, the transmission path 2, and the transmission path 3 to discard duplicated data. If the transmission path 1, the transmission path 2, the transmission path 3, and the transmission path 4 are all configured to be deactivated, and the transmission path 5 and the transmission path 6 are configured to be activated, the PDCP entity does not instruct RLC entities corresponding to the transmission path 1, the transmission path 2, the transmission path 3, and the transmission path 4 to discard duplicated data.

Further, it should be further noted that before step 501, the data processing method further includes:

obtaining configuration information of a PDCP data duplication function of a first RB of the terminal.

It should be noted that the following separately describes the embodiments of the present disclosure in detail from a perspective of whether to configure a main transmission path for the PDCP data duplication function.

1. The Main Transmission Path is not Configured.

In this case, the configuration information includes an initial state of the PDCP data duplication function of the first RB. For example, the initial state includes the activated state or the deactivated state.

It should be noted that the initial state is indicated by using the transmission path set. For example, in the case where the transmission path set indicates only one transmission path, it indicates that the PDCP data duplication function corresponding to the first RB is deactivated, and data corresponding to the RB is transmitted by using the indicated transmission path; and in the case where the transmission path set indicates at least two transmission paths, it indicates that the PDCP data duplication function corresponding to the RB is activated, and data corresponding to the first RB is transmitted by using the indicated transmission paths.

For example, in this case, an implementation of step 501 is as follows:

obtaining, by the PDCP entity of the terminal, indication information, where the indication information is used to indicate a transmission path that needs to be deactivated; and determining, by the PDCP entity of the terminal according to the indication information, the at least one first transmission path that is in the transmission path set currently in the activated state and that needs to be changed from the activated state to the deactivated state.

It should be noted that the indication information may be obtained in one of the following manners:

A11: The PDCP entity of the terminal receives indication information sent by a network device by using preset signaling.

The preset signaling includes Medium Access Control (MAC) signaling or Radio Resource Control (RRC) signaling.

A12: The PDCP entity of the terminal obtains indication information sent by a higher layer of the terminal.

For example, the higher layer of the terminal determines, based on a configuration of a network device or a condition agreed upon in a protocol, whether to deactivate a transmission path corresponding to a specific RB, and sends the indication information to the PDCP entity of the terminal.

It should be further noted that the indication information may be further used to indicate an activated transmission path. In this embodiment of the present disclosure, only a transmission path changing from the activated state to the deactivated state is considered. Therefore, a transmission path changing from the deactivated state to the activated state is not concerned in this embodiment of the present disclosure.

It should be further noted that in the case where the at least one first transmission path is all transmission paths in the transmission path set, the PDCP entity does not instruct an RLC entity corresponding to the first transmission path to discard duplicated data, and a MAC entity of the terminal transmits the duplicated data in the RLC entity corresponding to the first transmission path.

For example, in the case where the RLC entity corresponding to the transmission path changing from the activated state to the deactivated state still has data, a MAC entity corresponding to the RLC entity continues to allocate an uplink grant to the RLC entity, and the MAC entity transmits, according to a preset rule, the duplicated data in the RLC entity corresponding to the first transmission path.

For example, the preset rule includes:

a logical channel limitation corresponding to the RLC entity corresponding to the first transmission path is configured for the PDCP data duplication function, and when data in the RLC entity corresponding to the first transmission path is transmitted, the logical channel limitation is not used for a logical channel corresponding to the RLC entity corresponding to the first transmission path.

In other words, if a logical channel limitation corresponding to the RLC entity is configured because of the PDCP data duplication function, when the MAC entity transmits data in an RLC entity corresponding to a deactivated transmission path, a logical channel limitation (a limitation on mapping between a logical channel and a carrier, or a limitation on mapping between a logical channel and a frequency domain range (such as bandwidth part (BWP) mapping limitation)) is not used for a logical channel corresponding to the RLC entity. Otherwise, the logical channel limitation is used for the logical channel corresponding to the RLC entity.

2. The Main Transmission Path is Configured.

In this case, the configuration information may use any one of the following two manners:

Manner 1: The configuration information includes a main transmission path of the first RB.

It should be noted that the main transmission path is always in an activated state.

Manner 2: The configuration information includes a main transmission path of the first RB and an initial state of the PDCP data duplication function of the first RB.

For example, the initial state includes the activated state or the deactivated state.

Optionally, the initial state is indicated in at least one of the following manners:

B11. Indication information of a preset quantity of bits.

For example, indication information of one bit may be used. For example, when a value of the indication variable is "0", it indicates that a PDCP data duplication function corresponding to the RB is deactivated, and data corresponding to the RB is transmitted by using the main transmission path; and when the value of the indication variable is "1", it indicates that the PDCP data duplication function corresponding to the RB is activated, and the data corresponding to the RB is transmitted by using all configured transmission paths.

B12. The transmission path set.

For example, in the case where there is no other transmission path than the main transmission path indicated by the transmission path set, it indicates that the PDCP data duplication function corresponding to the RB is deactivated; and in the case where at least one transmission path is included other than the main transmission path indicated by the transmission path set, it indicates that the PDCP data duplication function corresponding to the RB is activated.

It should be further noted that in the case where the initial state is indicated by using both the indication information of the preset quantity of bits and the transmission path set, in the case where the initial state indicates that the PDCP data duplication function is activated, the transmission path set indicates an activated transmission path set.

For example, in this case, an implementation of step 501 is as follows:

receiving RRC signaling sent by a network device for reconfiguring the main transmission path;

and determining, by the PDCP entity of the terminal based on the RRC signaling, the at least one first transmission path that is in the transmission path set currently in the activated state and that needs to be changed from the activated state to the deactivated state; where the RRC signaling carries an initial state of a PDCP data duplication function obtained after the main transmission path is reconfigured.

It should be noted that the terminal may determine, based on the initial state of the PDCP data duplication function obtained after reconfiguration, transmission paths that are changed from the activated state to the deactivated state.

It should be further noted that in the case where the at least one first transmission path is all transmission paths in the transmission path set, the PDCP entity does not instruct an RLC entity corresponding to the first transmission path to discard duplicated data, and a MAC entity of the terminal transmits the duplicated data in the RLC entity corresponding to the first transmission path.

For example, in the case where the RLC entity corresponding to the transmission path changing from the activated state to the deactivated state still has data, a MAC entity corresponding to the RLC entity continues to allocate an uplink grant to the RLC entity, and the MAC entity transmits, according to a preset rule, the duplicated data in the RLC entity corresponding to the first transmission path.

For example, the preset rule includes:

a logical channel limitation corresponding to the RLC entity corresponding to the first transmission path is configured for the PDCP data duplication function, and when data in the RLC entity corresponding to the first transmission path is transmitted, the logical channel limitation is not used for a logical channel corresponding to the RLC entity corresponding to the first transmission path.

In other words, if a logical channel limitation corresponding to the RLC entity is configured because of the PDCP data duplication function, when the MAC entity transmits data in an RLC entity corresponding to a deactivated transmission path, a logical channel limitation (a limitation on mapping between a logical channel and a carrier, or a limitation on mapping between a logical channel and a frequency domain range (such as, BWP) mapping limitation) is not used for a logical channel corresponding to the RLC entity. Otherwise, the logical channel limitation is used for the logical channel corresponding to the RLC entity.

It should be further noted that, after the main transmission path is configured, behavior of the PDCP entity of the terminal may further include: determining, based on indication information of the deactivated transmission path, a second transmission path that is changed from the activated state to the deactivated state, and the PDCP entity instructs an RLC entity corresponding to the second transmission path to discard duplicated data.

For example, the indication information of the deactivated transmission path may be indicated by MAC signaling delivered by the network device, or may be indicated by signaling of a higher layer of the terminal. For example, the higher layer of the terminal determines, based on a configuration of the network device or a condition agreed upon in a protocol, whether to activate or deactivate a transmission path corresponding to a specific RB, and sends the indication information to the PDCP entity of the terminal.

It should be noted that, in this embodiment of the present disclosure, a PDCP entity of a terminal determines at least one first transmission path that is in a transmission path set currently in an activated state and that needs to be changed from the activated state to a deactivated state, and in the case where the at least one first transmission path is not all transmission paths in the transmission path set, the PDCP entity of the terminal instructs an RLC entity corresponding to the first transmission path to discard duplicated data. Because the discarded data has a copy in the transmission path currently in the activated state, packet removal can be avoided, and communication reliability can be ensured.

Figure 6:
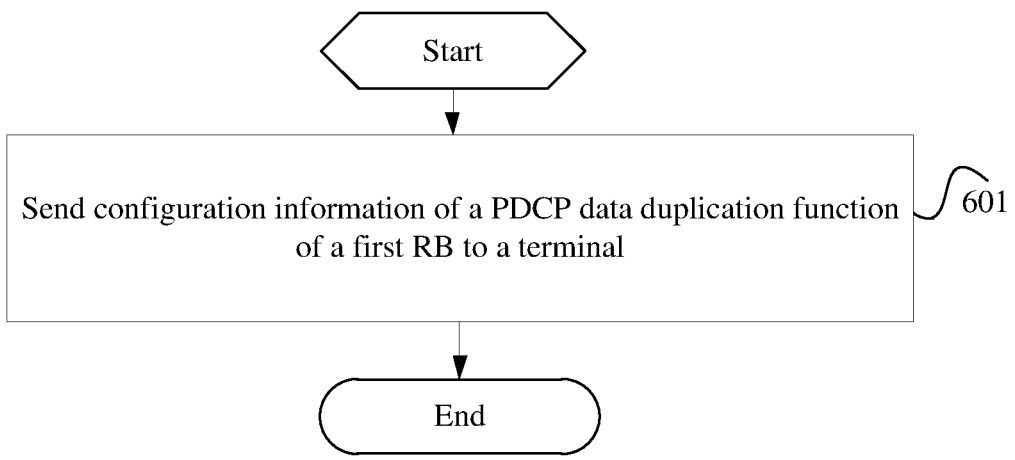
FIG. 6 is a schematic flowchart of an information configuration method according to an embodiment of the present disclosure.

As shown in FIG. 6, an embodiment of the present disclosure further provides an information configuration method. The information configuration method is applied to a network device and includes the following step:

Step 601: Send configuration information of a PDCP data duplication function of a first RB to a terminal.

The PDCP data duplication function corresponds to at least three transmission paths.

Optionally, the configuration information includes an initial state of the PDCP data duplication function of the first RB.

The initial state includes an activated state or a deactivated state.

Optionally, the initial state is indicated by using a transmission path set.

Optionally, the configuration information includes a main transmission path of the first RB; or the configuration information includes a main transmission path of the first RB and an initial state of the PDCP data duplication function of the first RB; where the initial state includes an activated state or a deactivated state.

Optionally, the initial state is indicated in at least one of the following manners:

indication information of a preset quantity of bits; or a transmission path set.

It should be noted that all descriptions of the network device in the foregoing embodiments are applicable to the embodiments of the information configuration method, and a same technical effect can also be achieved.

Figure 7:
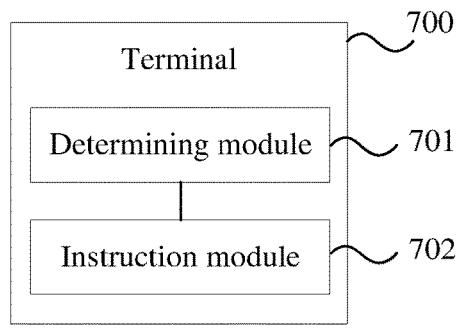
FIG. 7 is a schematic module diagram of a terminal according to an embodiment of the present disclosure.

As shown in FIG. 7, an embodiment of the present disclosure provides a terminal 700, including:

a determining module 701, configured to determine at least one first transmission path that is in a transmission path set currently in an activated state and that needs to be changed from the activated state to a deactivated state; and an instruction module 702, configured to: instruct a RLC entity corresponding to the first transmission path to discard duplicated data, in the case where the at least one first transmission path is not all transmission paths in the transmission path set; where the transmission path set includes at least one transmission path.

Optionally, before the determining module determines the at least one first transmission path that is in the transmission path set currently in the activated state and that needs to be changed from the activated state to the deactivated state, the terminal further includes:

an obtaining module, configured to obtain configuration information of a PDCP data duplication function of a first RB of the terminal; where the PDCP data duplication function corresponds to at least three transmission paths.

Optionally, the configuration information includes an initial state of the PDCP data duplication function of the first RB.

The initial state includes the activated state or the deactivated state.

Optionally, the initial state is indicated by using the transmission path set.

Optionally, the determining module 701 includes:
a first obtaining unit, configured to obtain indication information by a PDCP entity of the terminal, where the indication information is used to indicate a transmission path that needs to be deactivated; and
a first determining unit, configured to determine, by the PDCP entity of the terminal according to the indication information, the at least one first transmission path that is in the transmission path set currently in the activated state and that needs to be changed from the activated state to the deactivated state.

For example, the first obtaining unit is configured to:
receive, by the PDCP entity of the terminal, indication information sent by a network device by using preset signaling; or
obtain, by the PDCP entity of the terminal, indication information sent by a higher layer of the terminal; where
the preset signaling includes MAC signaling or RRC signaling.

Optionally, the configuration information includes a main transmission path of the first RB; or
the configuration information includes a main transmission path of the first RB and an initial state of the PDCP data duplication function of the first RB; where
the initial state includes the activated state or the deactivated state.

Optionally, the initial state is indicated in at least one of the following manners:
indication information of a preset quantity of bits; or
the transmission path set.

Optionally, the determining module 701 includes:
a receiving unit, configured to receive RRC signaling sent by a network device for reconfiguring the main transmission path; and
a second determining unit, configured to determine, based on the RRC signaling, the at least one first transmission path that is in the transmission path set currently in the activated state and that needs to be changed from the activated state to the deactivated state; where
the RRC signaling carries an initial state of a PDCP data duplication function obtained after the main transmission path is reconfigured.

Optionally, before the determining module 701 determines the at least one first transmission path that is in the transmission path set currently in the activated state and that needs to be changed from the activated state to the deactivated state, the terminal further includes:
a transmission module, configured to: transmit duplicated data in the RLC entity corresponding to the first transmission path, in the case where the at least one first transmission path is all transmission paths in the transmission path set.

Optionally, the transmission module is configured to:
transmit, according to a preset rule, the duplicated data in the RLC entity corresponding to the first transmission path; where
the preset rule includes:

a logical channel limitation corresponding to the RLC entity corresponding to the first transmission path is configured for the PDCP data duplication function, and when data in the RLC entity corresponding to the first transmission path is transmitted, the logical channel limitation is not used for a logical channel corresponding to the RLC entity corresponding to the first transmission path.

It should be noted that this terminal embodiment is a terminal corresponding to the foregoing data processing method applied to the terminal. All implementations of the foregoing embodiment are applicable to this terminal embodiment, and a same technical effect can also be achieved.

Figure 8:
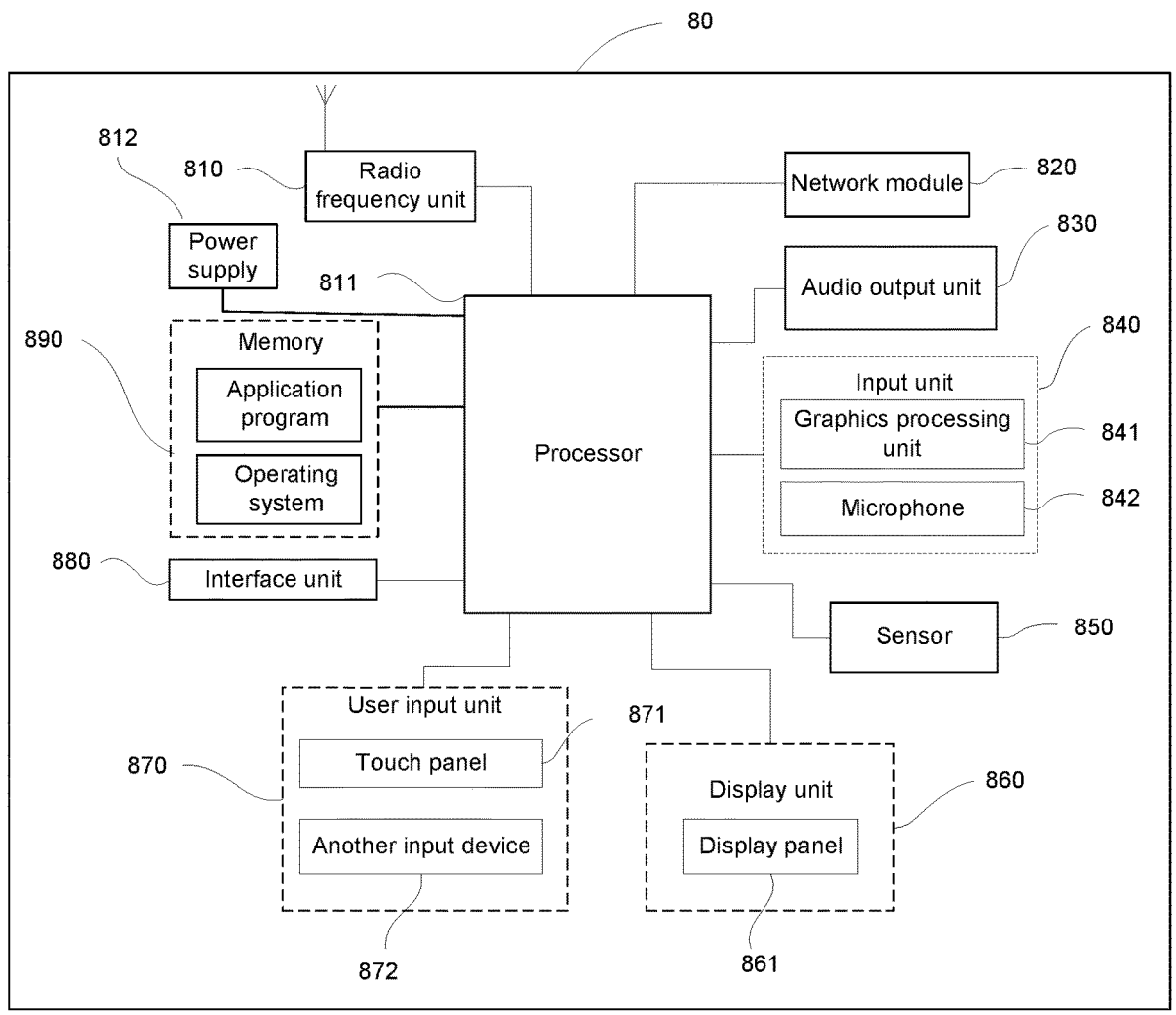
FIG. 8 is a structural block diagram of a terminal according to an embodiment of the present disclosure.

FIG. 8 is a schematic diagram of a hardware structure of a terminal according to an embodiment of the present disclosure.

The terminal 80 includes but is not limited to components such as a radio frequency unit 810, a network module 820, an audio output unit 830, an input unit 840, a sensor 850, a display unit 860, a user input unit 870, an interface unit 880, a memory 890, a processor 811, and a power supply 812. A person skilled in the art may understand that a structure of the terminal shown in FIG. 8 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The processor 811 is configured to: determine, by a PDCP entity of the terminal, at least one first transmission path that is in a transmission path set currently in an activated state and that needs to be changed from the activated state to a deactivated state; and in the case where the at least one first transmission path is not all transmission paths in the transmission path set, instruct, by the PDCP entity of the terminal, a RLC entity corresponding to the first transmission path to discard duplicated data; where
the transmission path set includes at least one transmission path.

The PDCP entity of the terminal in this embodiment of the present disclosure determines at least one first transmission path that is in a transmission path set currently in an activated state and that needs to be changed from the activated state to a deactivated state, and in the case where the at least one first transmission path is not all transmission paths in the transmission path set, the PDCP entity of the terminal instructs an RLC entity corresponding to the first transmission path to discard duplicated data. Because the discarded data has a copy in the transmission path currently in the activated state, packet removal can be avoided, and communication reliability can be ensured.

It should be understood that, in this embodiment of the present disclosure, the radio frequency unit 810 may be configured to receive and send information or receive and send a signal in a call process. For example, after downlink data from a network device is received, the processor 811 processes the downlink data. In addition, uplink data is sent to the network device. Generally, the radio frequency unit 810 includes but is not limited to an antenna, at least one amplifier, a transceiver, a coupler, a low noise amplifier, a duplexer, and the like. In addition, the radio frequency unit 810 may further communicate with a network and another device by using a wireless communication system.

The terminal provides wireless broadband Internet access for a user by using the network module 820, for example, helping the user send and receive an email, browse a web page, and access streaming media.

The audio output unit 830 may convert audio data received by the radio frequency unit 810 or the network module 820 or stored in the memory 890 into an audio signal and output as sound. In addition, the audio output unit 830 may further provide audio output (for example, call signal receiving sound or message receiving sound) related to a specific function performed by the terminal 80. The audio output unit 830 includes a loudspeaker, a buzzer, a telephone receiver, and the like.

The input unit 840 is configured to receive an audio or video signal. The input unit 840 may include a graphics processing unit (GPU) 841 and a microphone 842. The graphics processing unit 841 processes image data of a static picture or a video obtained by an image capture apparatus (such as a camera) in a video capture mode or an image capture mode. A processed image frame may be displayed on the display unit 860. The image frame processed by the graphics processing unit 841 may be stored in the memory 890 (or another storage medium) or sent by using the radio frequency unit 810 or the network module 820. The microphone 842 may receive sound and can process such sound into audio data. The processed audio data may be output by being converted into a format that may be sent to a mobile communications network device by using the radio frequency unit 810 in a telephone call mode.

The terminal 80 further includes at least one sensor 850, such as an optional sensor, a motion sensor, and another sensor. For example, the optional sensor includes an ambient light sensor and a proximity sensor. The ambient light sensor may adjust luminance of the display panel 861 based on brightness of ambient light, and the proximity sensor may disable the display panel 861 and/or backlight when the terminal 80 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 850 may further include a fingerprint sensor, a pressure sensor, an iris sensor, a molecular sensor, a gyroscope, a barometer, a hygrometer, a thermometer, an infrared sensor, and the like. This is not described herein.

The display unit 860 is configured to display information entered by the user or information provided for the user. The display unit 860 may include a display panel 861, and the display panel 861 may be configured in a form of a liquid crystal display (LCD), an organic light-emitting diode (OLED), or the like.

The user input unit 870 may be configured to receive input digit or character information and generate key signal input related to user setting and function control of the terminal. For example, the user input unit 870 includes a touch panel 871 and another input device 872. The touch panel 871, also referred to as a touchscreen, may collect a touch operation performed by the user on or near the touch panel 871 (for example, an operation performed by the user on or near the touch panel 871 by using any suitable object or accessory such as a finger or a stylus). The touch panel 871 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 811, and can receive and execute a command sent by the processor 811. In addition, the touch panel 871 may be implemented by using a plurality of types such as a resistive type, a capacitive type, an infrared ray, and a surface acoustic wave. The user input unit 870 may include another input device 872 in addition to the touch panel 871. For example, the another input device 872 may include but is not limited to a physical keyboard, a function key (such as a volume control key or an on/off key), a trackball, a mouse, a joystick, and the like. Details are not described herein.

Optionally, the touch panel 871 may cover the display panel 861. After detecting the touch operation on or near the touch panel 871, the touch panel 871 transmits the touch operation to the processor 811 to determine a type of a touch event, and then the processor 811 provides corresponding visual output on the display panel 861 based on the type of the touch event. In FIG. 8, the touch panel 871 and the display panel 861 are used as two independent components to implement input and output functions of the terminal. However, in some embodiments, the touch panel 871 and the display panel 861 may be integrated to implement the input and output functions of the terminal. This is not specifically limited herein.

The interface unit 880 is an interface connecting an external apparatus to the terminal 80. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 880 may be configured to receive input (for example, data information and power) from the external apparatus and transmit the received input to one or more elements in the terminal 80, or may be configured to transmit data between the terminal 80 and the external apparatus.

The memory 890 may be configured to store a software program and various data. The memory 890 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 890 may include a high-speed random access memory, and may further include a non-volatile memory such as at least one magnetic disk storage component, a flash memory component, or another volatile solid-state storage component.

The processor 811 is a control center of the terminal, and is connected to all parts of the entire terminal by using various interfaces and lines, and performs various functions of the terminal and processes data by running or executing the software program and/or the module that are stored in the memory 890 and invoking the data stored in the memory 890, to implement overall monitoring on the terminal. The processor 811 may include one or more processing units. Optionally, the processor 811 may be integrated with an application processor and a modem processor. The application processor mainly processes an operating system, a user interface, an application program, and the like, and the modem processor mainly processes wireless communication. It may be understood that the modem processor may also not be integrated into the processor 811.

The terminal 80 may further include a power supply 812 (such as a battery) that supplies power to each component. Optionally, the power supply 812 may be logically connected to the processor 811 by using a power management system, to implement functions such as charging, discharging, and power consumption management by using the power management system.

In addition, the terminal 80 includes some function modules not shown, and details are not described herein.

Optionally, an embodiment of the present disclosure further provides a terminal, including a processor 811, a memory 890, and a computer program that is stored in the memory 890 and executable on the processor 811. When the computer program is executed by the processor 811, each process of the foregoing data processing method embodiment applied to a terminal side can be implemented, and a same technical effect can be achieved. To avoid repetition, details are not described herein.

An embodiment of the present disclosure further provides a non-transitory computer-readable storage medium. A computer program is stored in the non-transitory computer-readable storage medium. When being executed by a processor, the computer program implements each process of the foregoing data processing method embodiment applied to a terminal side, and a same technical effect can be achieved. To avoid repetition, details are not described herein. The non-transitory computer-readable storage medium includes a read-only memory (ROM), a random access memory (RAM), a magnetic disk, an optical disc, or the like.

Figure 9:
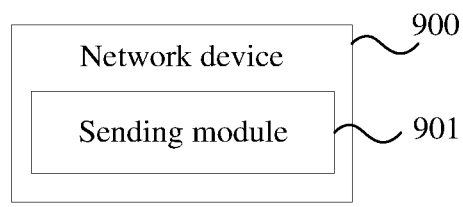
FIG. 9 is a schematic module diagram of a network device according to an embodiment of the present disclosure.

As shown in FIG. 9, an embodiment of the present disclosure further provides a network device 900, including:
- a sending module 901, configured to send configuration information of a PDCP data duplication function of a first RB to a terminal; where
- the PDCP data duplication function corresponds to at least three transmission paths.

Optionally, the configuration information includes an initial state of the PDCP data duplication function of the first RB.

The initial state includes an activated state or a deactivated state.

For example, the initial state is indicated by using a transmission path set.

Optionally, the configuration information includes a main transmission path of the first RB; or
- the configuration information includes a main transmission path of the first RB and an initial state of the PDCP data duplication function of the first RB; where
- the initial state includes an activated state or a deactivated state.

For example, the initial state is indicated in at least one of the following manners:
- indication information of a preset quantity of bits; or
- a transmission path set.

An embodiment of the present disclosure further provides a network device, including a memory, a processor, and a computer program that is stored in the memory and executable on the processor. When the computer program is executed by the processor, each process of the foregoing information configuration method embodiment applied to the network device can be implemented, and a same technical effect can be achieved. To avoid repetition, details are not described herein.

An embodiment of the present disclosure further provides a non-transitory computer-readable storage medium. A computer program is stored in the non-transitory computer-readable storage medium. When the computer program is executed by a processor, each process of the foregoing information configuration method embodiment applied to the network device is implemented, and a same technical effect can be achieved. To avoid repetition, details are not described herein. The non-transitory computer-readable storage medium includes a read-only memory (ROM), a random access memory (RAM), a magnetic disk, an optical disc, or the like.

Figure 10:
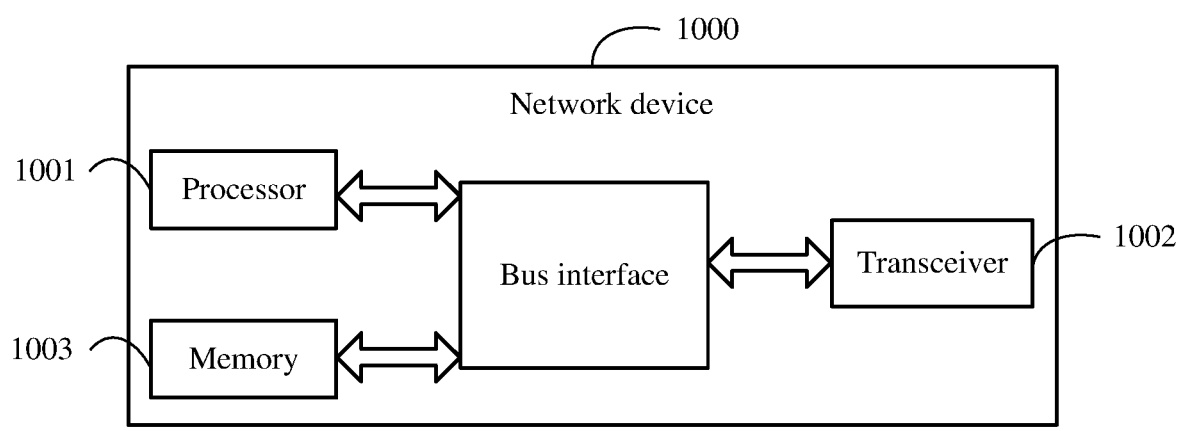
FIG. 10 is a structural block diagram of a network device according to an embodiment of the present disclosure.

FIG. 10 is a structural diagram of a network device according to an embodiment of the present disclosure. Details of the foregoing information configuration method can be implemented, and a same effect can be achieved. As shown in FIG. 10, a network device 1000 includes a processor 1001, a transceiver 1002, a memory 1003, and a bus interface.

The processor 1001 is configured to read a program in the memory 1003 and perform the following process:
- sending, by using the transceiver 1002, configuration information of a PDCP data duplication function of a first RB to a terminal; where
- the PDCP data duplication function corresponds to at least three transmission paths.

In FIG. 10, a bus architecture may include any quantity of interconnected buses and bridges, and is linked by various circuits of one or more processors represented by the processor 1001 and a memory represented by the memory 1003. The bus architecture may further link various other circuits such as a peripheral device, a voltage regulator, and a power management circuit together. These are all well-known in the art, and therefore are not further described in this specification. The bus interface provides interfaces. The transceiver 1002 may be multiple elements, in other words, includes a transmitter and a receiver, and provides a unit configured to communicate with various other apparatuses on a transmission medium.

Optionally, the configuration information includes an initial state of the PDCP data duplication function of the first RB.

The initial state includes an activated state or a deactivated state.

Optionally, the initial state is indicated by using a transmission path set.

Optionally, the configuration information includes a main transmission path of the first RB; or
- the configuration information includes a main transmission path of the first RB and an initial state of the PDCP data duplication function of the first RB; where
- the initial state includes an activated state or a deactivated state.

Optionally, the initial state is indicated in at least one of the following manners:
- indication information of a preset quantity of bits; or
- a transmission path set.

The network device may be a base transceiver station (BTS) in a Global System for Mobile Communications (GSM) or Code Division Multiple Access (CDMA), or may be a NodeB (NB) in Wideband Code Division Multiple Access (WCDMA), or may be an evolved NodeB (eNB or eNodeB) in LTE, or a relay station or an access point, or a base station in a future 5G network, which is not limited herein.

The foregoing description is an optional implementation of the present disclosure. It should be noted that, for a person of ordinary skill in the art, improvements and ornaments may be made without departing from the principles of the present disclosure. The improvements and ornaments are also within the protection scope of the present disclosure.

What is claimed is:

1. A data processing method, applied to a terminal and comprising:
   determining, by a packet data convergence protocol (PDCP) entity of the terminal, at least one first transmission path that is in a transmission path set currently in an activated state and that needs to be changed from the activated state to a deactivated state; and
   instructing, by the PDCP entity of the terminal, a radio link control (RLC) entity corresponding to the first transmission path to discard duplicated data, in a case where the at least one first transmission path is not all transmission paths in the transmission path set; wherein
   the transmission path set comprises at least one transmission path.

2. The data processing method according to claim 1, before the determining, by the PDCP entity of the terminal, at least one first transmission path that is in a transmission path set currently in an activated state and that needs to be changed from the activated state to a deactivated state, further comprising:
   obtaining configuration information of a PDCP data duplication function of a first radio bearer (RB) of the terminal; wherein
   the PDCP data duplication function corresponds to at least three transmission paths.

3. The data processing method according to claim 2, wherein the configuration information comprises an initial state of the PDCP data duplication function of the first RB; and
   the initial state comprises the activated state or the deactivated state.

4. The data processing method according to claim 3, wherein the initial state is indicated by using the transmission path set.

5. The data processing method according to claim 3, wherein the determining, by the PDCP entity of the terminal, at least one first transmission path that is in a transmission path set currently in an activated state and that needs to be changed from the activated state to a deactivated state comprises:
   obtaining, by the PDCP entity of the terminal, indication information, wherein the indication information is used to indicate a transmission path that needs to be deactivated; and
   determining, by the PDCP entity of the terminal according to the indication information, the at least one first transmission path that is in the transmission path set currently in the activated state and that needs to be changed from the activated state to the deactivated state.

6. The data processing method according to claim 5, wherein the obtaining, by the PDCP entity of the terminal, indication information comprises:
   receiving, by the PDCP entity of the terminal, indication information sent by a network device by using preset signaling; or
   obtaining, by the PDCP entity of the terminal, indication information sent by a higher layer of the terminal; wherein
   the preset signaling comprises media access control (MAC) signaling or radio resource control (RRC) signaling.

7. The data processing method according to claim 2, wherein the configuration information comprises a main transmission path of the first RB; or
   the configuration information comprises a main transmission path of the first RB and an initial state of the PDCP data duplication function of the first RB; wherein
   the initial state comprises the activated state or the deactivated state.

8. The data processing method according to claim 7, wherein the initial state is indicated in at least one of following manners:
   indication information of a preset quantity of bits; or
   the transmission path set.

9. The data processing method according to claim 7, wherein the determining, by the PDCP entity of the terminal, at least one first transmission path that is in a transmission path set currently in an activated state and that needs to be changed from the activated state to a deactivated state comprises:
   receiving radio resource control (RRC) signaling sent by a network device for reconfiguring the main transmission path; and
   determining, by the PDCP entity of the terminal based on the RRC signaling, the at least one first transmission path that is in the transmission path set currently in the activated state and that needs to be changed from the activated state to the deactivated state; wherein
   the RRC signaling carries an initial state of a PDCP data duplication function obtained after the main transmission path is reconfigured.

10. The data processing method according to claim 1, after the determining, by the PDCP entity of the terminal, at least one first transmission path that is in a transmission path set currently in an activated state and that needs to be changed from the activated state to a deactivated state, the data processing method further comprises:
    in the case where the at least one first transmission path is all transmission paths in the transmission path set, transmitting duplicated data in the RLC entity corresponding to the first transmission path.

11. The data processing method according to claim 10, wherein the transmitting duplicated data in the RLC entity corresponding to the first transmission path comprises:
    transmitting, according to a preset rule, the duplicated data in the RLC entity corresponding to the first transmission path; wherein
    the preset rule comprises:
    a logical channel limitation corresponding to the RLC entity corresponding to the first transmission path is configured for the PDCP data duplication function, and when data in the RLC entity corresponding to the first transmission path is transmitted, the logical channel limitation is not used for a logical channel corresponding to the RLC entity corresponding to the first transmission path.

12. An information configuration method, applied to a network device and comprising:
    sending configuration information of a packet data convergence protocol (PDCP) data duplication function of a first radio bearer (RB) to a terminal; and
    sending indication information to the terminal by using preset signaling, the indication information being used to indicate a transmission path that needs to be deactivated; wherein
    the PDCP data duplication function corresponds to at least three transmission paths.

13. The information configuration method according to claim 12, wherein the configuration information comprises an initial state of the PDCP data duplication function of the first RB; and the initial state comprises an activated state or a deactivated state.

14. The information configuration method according to claim 13, wherein the initial state is indicated by using a transmission path set.

15. The information configuration method according to claim 12, wherein the configuration information comprises a main transmission path of the first RB; or the configuration information comprises a main transmission path of the first RB and an initial state of the PDCP data duplication function of the first RB; wherein the initial state comprises an activated state or a deactivated state.

16. The information configuration method according to claim 15, wherein the initial state is indicated in at least one of following manners:

indication information of a preset quantity of bits; or a transmission path set.

17. A terminal, comprising: a memory, a processor, and a program that is stored in the memory and executable on the processor, wherein the program, when executed by the processor, causes a packet data convergence protocol (PDCP) entity of the terminal to perform:

determining at least one first transmission path that is in a transmission path set currently in an activated state and that needs to be changed from the activated state to a deactivated state; and instructing a radio link control (RLC) entity corresponding to the first transmission path to discard duplicated data, in a case where the at least one first transmission path is not all transmission paths in the transmission path set; wherein the transmission path set comprises at least one transmission path.

18. The terminal according to claim 17, wherein the program, when executed by the processor, causes the PDCP entity of the terminal to further perform:

obtaining configuration information of a PDCP data duplication function of a first radio bearer (RB) of the terminal, wherein the PDCP data duplication function corresponds to at least three transmission paths.

19. The terminal according to claim 18, wherein the configuration information comprises an initial state of the PDCP data duplication function of the first RB; and the initial state comprises the activated state or the deactivated state.

20. A network device, comprising: a memory, a processor, and a program that is stored in the memory and executable on the processor, wherein the program, when executed by the processor, causes the network device to perform steps of the information configuration method according to claim 12.

* * * * *